United States Patent [19]

Yamada

[11] Patent Number: 5,327,367
[45] Date of Patent: Jul. 5, 1994

[54] COMPUTER SYSTEM WITH VECTOR FUNCTIONAL UNIT FOR FAST FOURIER TRANSFORM

[75] Inventor: Shouichirou Yamada, Tokyo, Japan

[73] Assignee: NEC Corporation, Tokyo, Japan

[21] Appl. No.: 986,535

[22] Filed: Dec. 7, 1992

[30] Foreign Application Priority Data

Dec. 5, 1991 [JP] Japan ................................ 3-348345

[51] Int. Cl.⁵ .......................................... G06F 15/332
[52] U.S. Cl. .................................................. 364/726
[58] Field of Search ................................ 364/725, 726

[56] References Cited

U.S. PATENT DOCUMENTS

| | | | |
|---|---|---|---|
| 4,223,185 | 9/1980 | Picou | 364/726 X |
| 4,231,102 | 10/1980 | Barr et al. | 364/726 |
| 4,899,301 | 2/1990 | Nishitani et al. | 364/726 |

*Primary Examiner*—Tan V. Mai
*Attorney, Agent, or Firm*—Foley & Lardner

[57] ABSTRACT

A computer system for Fast Fourier Transform provided with a vector functional unit with a process to store rotation factors. The input elements are multiplied in Fast Fourier Transform into an array. When the number of the rotation factors with the same value is not less than the maximum number of vector elements for the vector functional unit, the rotation factor with the same value is stored only once each time the vector elements amounts to the maximum number.

6 Claims, 4 Drawing Sheets

| STAGE 1 | STAGE 2 | STAGE 3 |
|---------|---------|---------|
| W 0 | W 0 | W 0 |
| W 1 | W 2 | W 0 |
| W 2 | | |
| W 3 | | |

ROTATION FACTOR STORING ARRAY
W OF THIS INVENTION

| STAGE 1 | STAGE 2 | STAGE 3 |
|---------|---------|---------|
| W 0     | W 0     | W 0     |
| W 1     | W 2     | W 0     |
| W 2     |         |         |
| W 3     |         |         |

ROTATION FACTOR STORING ARRAY
W OF THIS INVENTION f0~f7 : INPUT ELEMENTS
F0~F7 : OUTPUT ELEMENTS
Wi : ROTATION FACTOR = e ** (2πi / N)
→ : * (−1)

DATA FLOW OF FAST FOURIER TRANSFORM WHERE THE NUMBER OF ELEMENTS N IS 8

FLOWCHART OF ROTATION
FACTOR LOADING
OF THIS INVENTION

| STAGE 1 | STAGE 2 | STAGE 3 |
|---------|---------|---------|
| W 0 | W 0 | W 0 |
| W 1 | W 0 | W 0 |
| W 2 | W 2 | W 0 |
| W 3 | W 2 | W 0 |

CONVENTION ROTATION FACTOR STORING ARRAY W

FLOWCHART OF CONVENTIONAL ROTATION FACTOR LOADING

COMPUTER SYSTEM WITH VECTOR FUNCTIONAL UNIT FOR FAST FOURIER TRANSFORM

BACKGROUND OF THE INVENTION

1. Field of the Invention

The present invention relates to Fast Fourier Transform on a computer system provided with a vector functional unit, and in particular relates to a Fast Fourier Transform system with reduced storing area for rotation factors used in Fast Fourier Transform.

2. Description of the Prior Art

Fast Fourier Transform processing on a computer system provided with a vector functional unit requires that a procedure consisting of input element rearrangement, vector addition, vector subtraction and rotation factor multiplication to be performed for three stages. In a conventional system, rotation factors to be vector loaded and used in each of the three stages are stored as they are in a rotation factor storing array as shown in FIG. 5.

Specifically, as shown in the flowchart of FIG. 6, rotation factors are read from the rotation factor storing array W as in FIG. 5 for every stage through vector loading.

When the rotation factors for all stages are stored in the storing array W as in FIG. 5, the area to store them needs to have a size as follows:

$$S = N/2 \times \log N$$

where S is the size of the rotation factor storing area, N is the number of elements for Fast Fourier Transform, and log is a logarithm to the base two.

The size S of the storing area is generally larger than the size of input elements; when the number of elements for Fast Fourier Transform increases, the area to store the rotation factors becomes quite large. Besides, vector loading/storing must be performed the number of times represented by powers of 2 for rotation factor generation, which requires much time.

Thus, in a conventional Fast Fourier Transform system using a vector functional unit, rotation factors to be vector loaded and used for every stage of Fast Fourier Transform processing are stored as they are, which results in a large storing area. This causes a drawback of insufficient main storage memory capacity when there are many elements to be processed.

SUMMARY OF THE INVENTION

It is an object of the present invention to provide a computer system for Fast Fourier Transform provided with a vector functional unit which solves the problem of insufficient memory capacity at the main storage and enables faster transform processing, both through reduction of the rotation factor storing area.

According to an embodiment of the present invention to attain the above object, a computer system for Fast Fourier Transform with a vector functional unit is provided with a process to store rotation factors by which the input elements are multiplied in Fast Fourier Transform into an array wherein, when the number of the rotation factors with the same value is not less than the maximum number of vector elements for the vector functional unit, the rotation factor with the same value is stored only once each time the vector elements amounts to the maximum number.

According to a preferred embodiment of the present invention, the size of the rotation factor array area is log $VL \times N/2 + N/2 \times 1/VL \times (\log N - \log VL)$ where N is the number of input elements of Fast Fourier Transform, VL is the maximum number of vector elements and log is a logarithm to the base two.

According to another embodiment of the present invention to attain the above object, a computer system for Fast Fourier Transform with a vector functional unit is provided with a process to store rotation factors by which the input elements are multiplied in Fast Fourier Transform into an array wherein, when the number of the rotation factors with the same value is not less than the maximum number of vector elements for the vector functional unit, the rotation factor with the same value is stored only once each time the vector elements amounts to the maximum number, and also with a process to load rotation factors from the rotation factor array wherein, when the rotation factors to be loaded for a single vector instruction have the same value, the values of the rotation factors are scalar loaded, and when the rotation factors to be loaded for a single vector instruction have different value, the rotation factors are vector loaded.

Other objects, characteristics and effects of the present invention will be clarified from the detailed description below.

DESCRIPTION OF THE PREFERRED EMBODIMENT

Referring to the attached figures, a preferred embodiment of an information processing device according to the present invention will be described below.

Figures 1, 3:
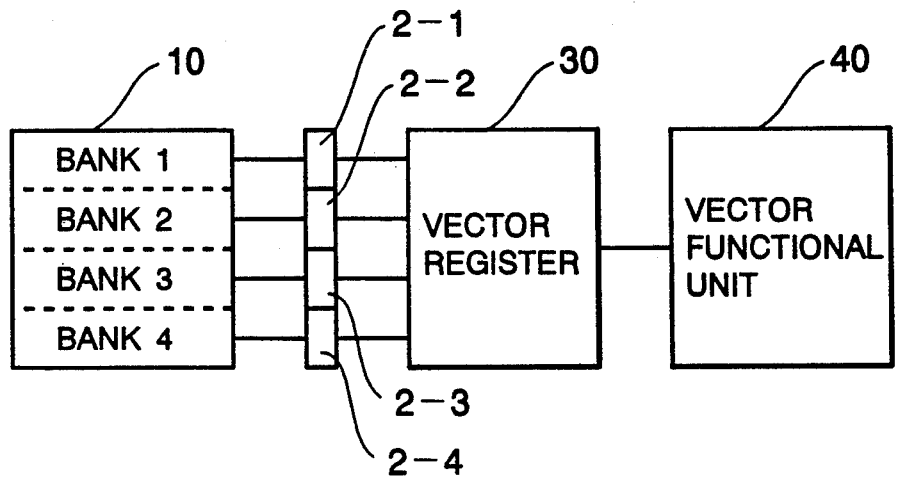
FIG. 1 is a block diagram to show the configuration outline of a computer system for Fast Fourier Transform to which the present invention is applied.
FIG. 3 is a diagram to show an example of rotation factor storing array according to the present invention.

FIG. 1 is a block diagram to show the configuration outline of a computer system for Fast Fourier Transform provided with a vector functional unit. In the figure, the reference numeral 10 indicates a main memory, the numerals 2-1 to 2-4 are memory access controllers, 30 is a vector register and 40 is a vector functional unit. The main memory 10 actually has, for example, 512 banks, but it is provided with only four banks in the figure for easier understanding. A memory access controller 2-$i$ ($i$ may be 1, 2, 3 or 4) reads element data for Fast Fourier Transform from the bank $i$ and writes data to the bank $i$ in the main memory 10. The vector register 30 has a plurality of element storing areas.

This Fast Fourier Transform system is provided with a function to decrease the size of rotation factor storing array required in Fast Fourier Transform by considering the maximum number of vector elements (maximum vector length) for the vector functional unit.

Figure 2:
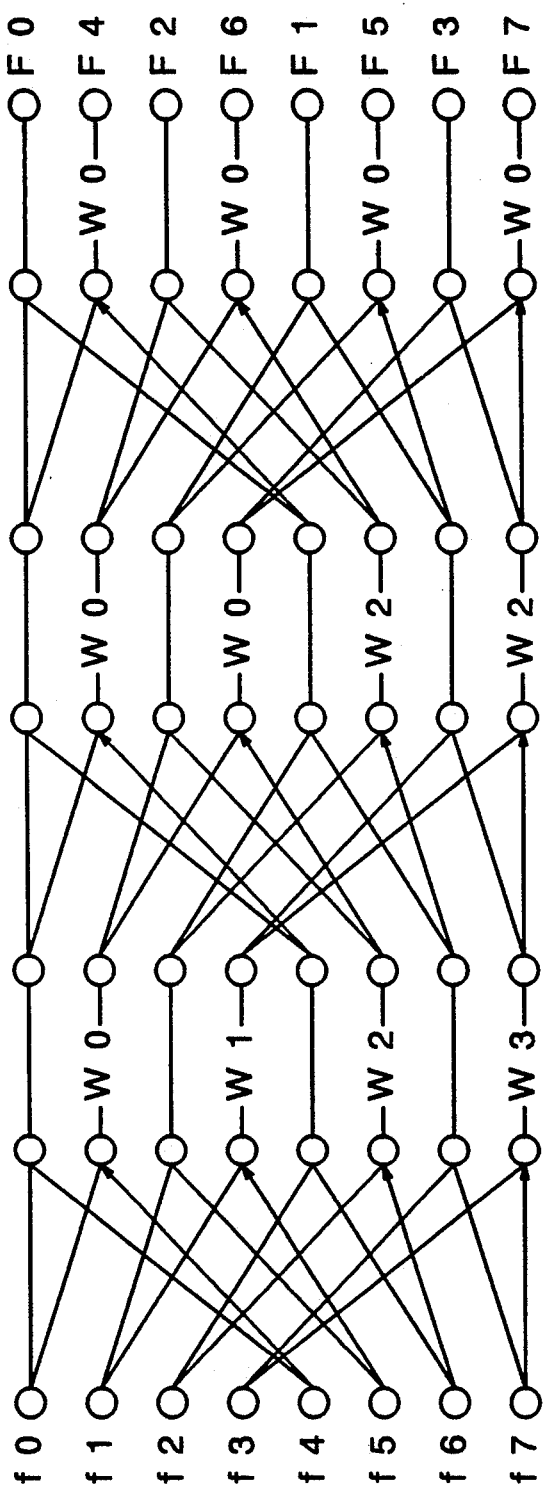
FIG. 2 is a diagram to show an example of data flow in the ISOGEOMETRIC type Fast Fourier Transform.

FIG. 2 shows the data flow in the ISOGEOMETRIC type Fast Fourier Transform when the number of elements is 8.

Input elements are indicated by f0 to f7 and output elements by F0 to F7. The input elements f0 to f7 are rearranged, subjected to vector addition/subtraction and then multiplied by rotation factors W0 to W3, so as to generate the output elements F0 to F7. This flow can be processed by vector processing. Rotation factors W0 to W3 are used in the stage 1, W0 and W2 in the stage 2 and W0 in the stage 3. The factor W0 is required in all stages.

Figures 5, 6:
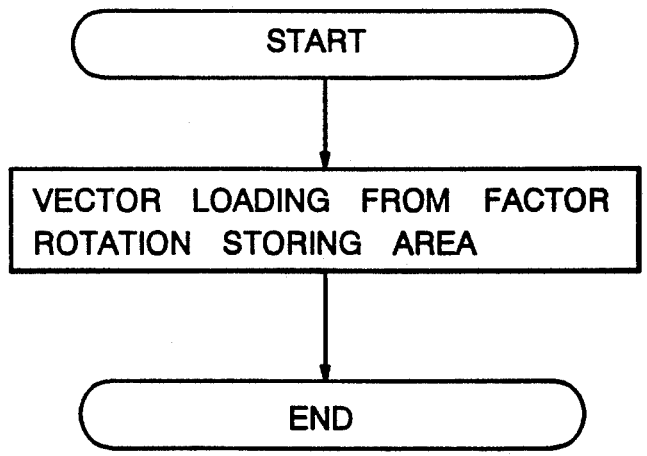
FIG. 5 is a diagram to show an example of a conventional rotation factor storing array.
FIG. 6 is a flowchart to illustrate a process of rotation factor loading from the rotation factor storing array as shown in FIG. 5.

In Fast Fourier Transform, the number of rotation factors with the same value is doubled for every stage as in the array of FIG. 5. In an embodiment of the present invention, the rotation factor storing area is reduced by utilizing this fact and the maximum number of vector elements (maximum vector length) for the vector functional unit.

Referring to the rotation factor array of FIG. 5 for example, the rotation factor W0 amounts to one at Stage 1, two at Stage 2 and four at Stage 3; it is doubled every stage. Similarly, the rotation factor W2 amounts to one at Stage 1 and two at stage 2; W2 is also doubled every stage.

The number of rotation factors loaded for a single vector instruction is limited to the maximum number of vector elements (maximum vector length) for the vector functional unit. In this embodiment, the maximum number of vector elements is two, and two rotation factors corresponding to the maximum number of vector elements are loaded from the array for each vector instruction for rotation factor multiplication. In case of the array shown in FIG. 5, for example, the rotation factors W0 and W1 first, and then W2 and W3 are loaded at Stage 1. At Stage 2, two W0's are loaded as the rotation factors having the same value, and two W2's are loaded also as the rotation factors having the same value. At Stage 3, four W0's are loaded in two processes as the rotation factors having the same value.

Thus, the number of rotation factors loaded for a single vector instruction is the same as the maximum number of vector elements (maximum vector length) for the vector functional unit. Therefore, if certain rotation factors having the same value are equal to or more than the maximum number of vector elements (maximum vector length), that rotation factor can be stored only once in the array for the maximum number of vector elements (maximum vector length).

Referring to FIG. 5 for example, the number of rotation factor W0's at Stage 2 is two, which is equal to the maximum number of vector elements (maximum vector length). Accordingly, the rotation factor W0 is stored only once for the maximum number of vector elements (maximum vector length) as shown in the array of FIG. 3. Similarly, since there are two rotation factors W2 at Stage 2, which is the same as the maximum number of vector elements (maximum vector length), the rotation factor W2 is also stored only once for the maximum number of vector elements (maximum vector length). The rotation factors W0 and W2 thus stored are scalar loaded for each vector instruction.

Thus, the rotation factor storing array in FIG. 3 can be of a size smaller than the conventional one (in FIG. 5).

When rotation factors are stored according to the present invention, the size S of the storing array can be determined by the formula below.

$$S = \log VL \times N/2 + N/2 \times 1/VL \times (\log N - \log VL)$$

where S is the size of the rotation factor storing area, N is the number Of elements for Fast Fourier Transform, VL is the maximum number of vector elements for the vector functional unit and log is a logarithm to the base two.

In case that the maximum number VL is smaller than the size N, the above formula is applied to a decision of the size of the storing array. However, in case that A is larger than B, the formula $S = N/2 \times \log N$ is applicable to a decision of the size.

For the fast Fourier Transform processing as shown in FIG. 2, the rotation factor storing area conventionally has, as shown in the array of FIG. 5, a size of 12, which is the value obtained from the formula $S = N/2 \times \log N$. When the present invention is applied, the rotation factor storing area has a size of 8 (FIG. 3), which is smaller than the conventional one.

Figure 4:
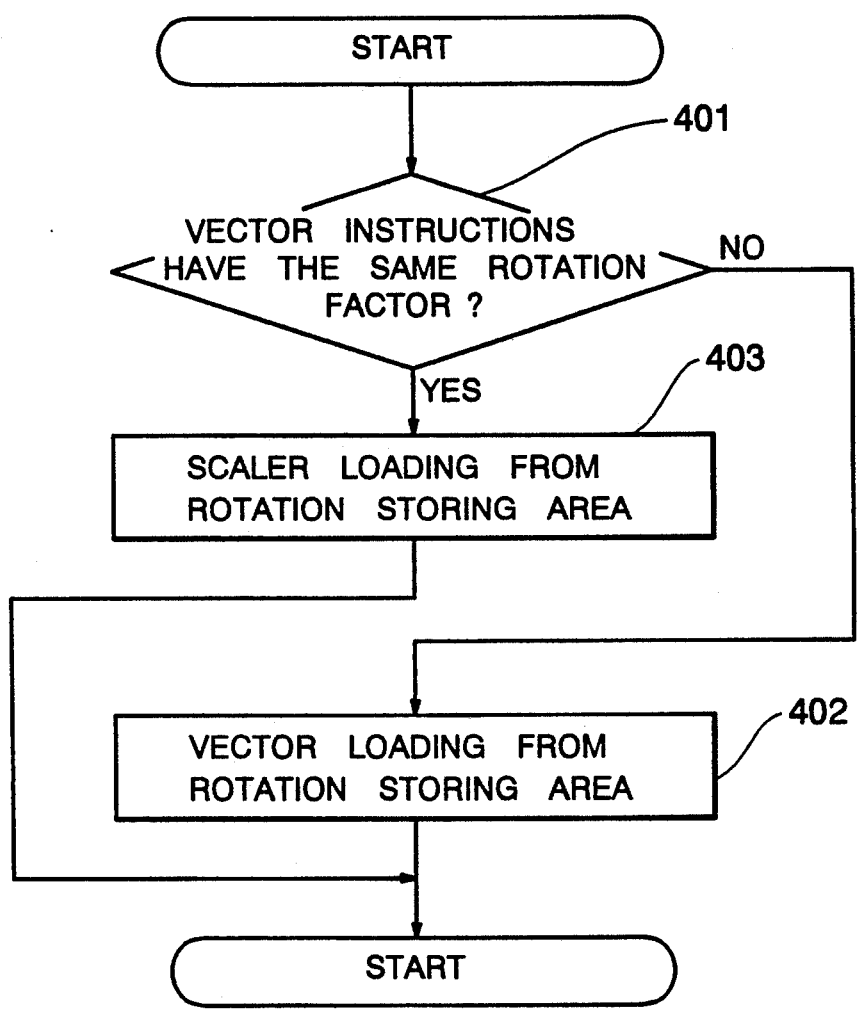
FIG. 4 is a flowchart to show a process of rotation factor loading from the rotation factor storing array according to the present invention.

FIG. 4 is a flowchart to illustrate the rotation factor loading using the rotation factor storing array as shown in FIG. 3.

In the first step, before loading of rotation factors by the maximum number of vector elements for each vector instruction, it is judged whether the rotation factors to be loaded have the same value or not (Step 401). In the processing at Stage 1 of the Fast Fourier Transform as shown in FIG. 2, the rotation factors have different values, and the answer for Step 401 is No. In this case, the values are vector loaded from the rotation factor storing area for rotation factor multiplication (Step 402). Specifically, the rotation factors W0 and W1 first, and then the rotation factors W2 and W3 are vector loaded.

In the processing at Stage 2 of Fast Fourier Transform, the W0 rotation factors have the same value and the W2 rotation factors have the same value, and the answer for Step 401 is Yes. In this case, rotation factors are scalar loaded from the rotation factor storing area for multiplication (Step 402). Specifically, the value of the stored rotation factor W0 is firstly scalar loaded for the number corresponding to the maximum number of vector elements, and then the value of the rotation factor W2 is scalar loaded for the number corresponding to the maximum number of vector elements. At Stage 3 of the Fast Fourier Transform as shown in FIG. 2, all rotation factors (W0) have the same value. In this case, the answer is Yes for Step 401, and the value of the rotation factor is scalar loaded from the rotation factor storing area for multiplication (Step 402). Specifically, the value of the stored rotation factor W0 is firstly scalar loaded for the number corresponding to the maximum number of vector elements, and then the value of the rotation factor W0 again is scalar loaded for the number corresponding to the maximum number of vector elements.

As understood from the above description, the conventional method where all rotation factors are vector loaded as shown in FIG. 6 requires that all of the rotation factors used in different stages be kept in the rotation factor storing array, which results in the size S of the storing area needing to be $N/2 \times \log N$. According to the method of the present invention, on the other hand, the size S of the storing area is S = log $VL \times N/2 + N/2 \times 1/VL \times (\log N - \log VL)$. This is smaller than the storing area in the conventional method. In addition, the reduced size of the rotation factor storing area helps speed up the processing of rotation factor generation.

Obviously, various changes and modifications can be made to the present invention. In the above embodiment, for example, there are 8 input elements for Fast Fourier Transform. However, even if the number of input elements is more or less than 8, the invention can be applied. It is intended to cover in the appended claims all such modifications and variations as fall within the true spirit and scope of the invention.

What is claimed is:

1. A computer system for Fast Fourier Transform with a vector functional unit having a maximum number of vector elements, comprising:

means for storing rotation factors by which a plurality of input elements are multiplied in Fast Fourier Transform into an array of rotation factors;

wherein, when a number of said rotation factors with a same value is not less than the maximum number of vector elements for said vector functional unit, each rotation factor with the same value is stored only once each time the vector element amounts to said maximum number.

2. A computer system for Fast Fourier Transform with a vector functional unit as claimed in claim 1, wherein the size of said rotation factor array area is:

$\log VL \times N/2 + N/2 \times 1/VL \times (\log N - \log VL)$ where N is a number of the input elements, VL is said maximum number of vector elements and log is a logarithm to the base two.

3. A computer system for Fast Fourier Transform with a vector functional unit having a maximum number of vector elements, comprising:

means for storing rotation factors by which a plurality of input elements are multiplied in Fast Fourier Transform into an array of rotation factors;

wherein, when the number of said rotation factors with a same value is not less than the maximum number of vector elements for said vector functional unit, each rotation factor with the same value is stored only once each time the vector element amounts to said maximum number, and means for loading rotation factors from said rotation factor array;

wherein, when the rotation factors to be loaded for a single vector instruction have a same value, the values of the rotation factors are scalar loaded, and when the rotation factors to be loaded for a single vector instruction have different values, the rotation factors are vector loaded.

4. A computer system for Fast Fourier Transform with a vector functional unit as claimed in claim 3, wherein the size of said rotation factor array is:

$\log VL \times N/2 + N/2 \times 1/VL \times (\log N - \log VL)$ where N is a number of the input elements, VL is said maximum number of vector elements and log is a logarithm to the base two.

5. A method for Fast Fourier Transform with a vector functional unit having a maximum number of vector elements, comprising the steps of:

storing a plurality of rotation factors by which a plurality of input elements are multiplied in Fast Fourier Transform into an array of rotation factors;

storing each rotation factor with a same value only once into said array of rotation factors each time the vector element amounts to said maximum number, when a number of said rotation factors with a same value is not less than the maximum number of vector elements for said vector functional unit;

scalar loading rotation factors from said rotation factor array when the rotation factors to be loaded for a single vector instruction have a same value; and vector loading rotation factors from said rotation factor array when the rotation factors to be loaded for a single vector instruction have different values.

6. A method for Fast Fourier Transform as claimed in claim 5, wherein the size of said rotation factor array area is:

$\log VL \times N/2 + N/2 \times 1/VL \times (\log N - \log VL)$ where N is a number of the input elements, VL is said maximum number of vector elements and log is a logarithm to the base two.

* * * * *